United States Patent [19]

Sridhar

[11] Patent Number: 5,699,413
[45] Date of Patent: Dec. 16, 1997

[54] VOICE DATA MODEM, VOICE DATA METHOD AND VOICE DATA MODEM SYSTEM

[75] Inventor: Manickam R. Sridhar, Holliston, Mass.

[73] Assignee: Motorola, Inc., Schaumburg, Ill.

[21] Appl. No.: 572,201

[22] Filed: Dec. 13, 1995

[51] Int. Cl.$^6$ .................................................. H04M 11/00
[52] U.S. Cl. ............................ 379/98; 379/93; 370/496; 375/222
[58] Field of Search .................. 379/97–99, 93, 379/202, 387, 399, 402, 405, 414; 370/259, 495, 496; 375/222, 295

[56] References Cited

U.S. PATENT DOCUMENTS

5,453,986   9/1995   Davis et al. ............................ 370/495

Primary Examiner—Wing F. Chan
Attorney, Agent, or Firm—Nancy R. Gamburd; John W. Powell

[57] ABSTRACT

A system (10) and method for simultaneously enabling a voice and a data session has a voice data modem (200) coupleable to a data port (255), a voice jack (240), and a telco jack (280). The data port (255) is connected to data terminal equipment (100), the voice jack (240) is connected to a telephone, and the telco jack (280) is connected to a telephone network (120). The data ports for each of a plurality of voice data modems are connected to other data terminal equipment (180, 181, 182), the voice jacks are connected to first extensions of a net telco jacks are connected to different, second extensions of the network. The voice data modem (200) may receive multiplexed voice and data over a single, first extension of the network through the telco jack, (280), dumultiplex and decompress the voice and data, transmit or retransmit the voice separately from the data over a second network extension via the voice jack (240), and transmit the data to data terminal equipment through a data port or interface (255). The voice data modem (200) used in such a system (10) has a dial call progress unit (245) capable of both initiating and terminating a telephone call through either the voice jack (240) or the telco jack (280).

3 Claims, 7 Drawing Sheets

VOICE DATA MODEM, VOICE DATA METHOD AND VOICE DATA MODEM SYSTEM

FIELD OF THE INVENTION

This invention relates, in general, to data communications and data communciations systems and devices and, more specifically, to modems utilized in data and voice communications.

BACKGROUND OF THE INVENTION

Data communications devices ("DCDs"), such as analog and digital modems, provide the means for the transmission of data over communications channels, such as, respectively, the analog telephone network commonly known as the Public Switched Telephone Network ("PSTN") and the digital network commonly known as the Integrated Services Digital Network ("ISDN"). Various communications applications support and require such modem operation in which, among other things, digital data is modulated onto and demodulated from an analog carrier. For digital modems, the modulated data is also reconverted to digital form for initial ISDN transmission to be followed by PSTN transmission. In many if not most circumstances, these modems are utilized to enable data terminal equipment ("DTEs"), such as a computer or workstation, at one location such as a local location, to communicate with another computer, workstation, or other DTE at another location, such as a remote location. Also in many, if not most, circumstances, the data communication between these separate locations will be over the PSTN via analog modems, with each modem having a single telephone line for connection over the PSTN.

Under such circumstances involving a single telephone line from either the local or remote modem to the PSTN, during data transmission or other ongoing communication, the single telephone line was typically unavailable for other uses and purposes. For example, the computer operators such as business co-workers may need to communicate verbally with each other during the data transmission process. In the past, in order for such additional communication to occur, a second telephone call would be originated between the computer operators on a second, separate telephone line. Voice data modems ("VDMs") have now been developed, however, which am capable of simultaneously having a data session as well as a voice session over a single telephone line. Speech (voice) is input to the VDM through a connected telephone. The speech is digitized and compressed into speech data, which is then multiplexed with other data (from, for example, the computer or other DTE) and transmitted by the VDM. A VDM at another location receives the data, demultiplexes the speech data from the other data, decompresses the speech data, and then transforms the digital data representation of the speech into analog speech (voice).

Such a VDM allows a computer operator at a first location, such as a local location, to communicate both voice and data to a computer and an operator at a second (or remote) location. Such a VDM, however, does not allow the operator at the first location to have voice (telephone) contact with persons other than the current operator of the computer at the second location, with whom data communication has been established via the telephone line connection. Correspondingly, the VDM operator at the first location, having telephone contact with the operator at the second location, cannot have data communication with a computer at a location other than the second location, such as a third location. For example, the operator at the first location, having a voice or data session with the second location, cannot have a data or voice session, respectively, with persons at a third location.

There are circumstances, however, in which such additional communication is desirable. For example, in home office environments, an individual may desire to transfer a data file electronically to one location via the telephone line, and simultaneously have a telephone conference with others at a second location, without the additional expense and maintenance of a second or third telephone line. In other situations, such as when the person is communicating with an office having a local area network (LAN), this is a serious hinderance because considerable information is available through the LAN, such as through a file server or an E-mail (electronic mail) server. In such a situation, the person cannot simultaneously have a telephonic conversation and access the LAN. Accordingly, a need has remained for a voice data modem, a voice data method, and a voice data modem system in which a user at a first location may simultaneously transfer data to or from a second location and simultaneously have a telephone conversation or conference with persons at a third location.

DETAILED DESCRIPTION OF THE INVENTION

As mentioned above, currently a significant obstacle in the use of voice data modems, over a single telephone line, concerns the inability of voice data modems to have simultaneous voice and data sessions with devices or operators at different locations. For example, in the prior art, a user at a first location having a data session with a user at a second location cannot simultaneously have a voice session over the same telephone line with a user at a third location. The apparatus, method and system in accordance with the present invention overcomes this difficulty, and provides for a user at a first location to simultaneously have a data session with a user at a second location and a voice session with a user at a third location, all over the same, single telephone line. This allows the voice session to operate independently of the data session, and vice-versa. In home office environments, this apparatus, method and system may save the added expense of installation and maintenance of a second telephone line. In other environments, such as during business travel when a second telephone line may be unavailable, this apparatus, method and system enables such diverse communication which was previously unavailable. For example, the apparatus, method and system allows for a data connection and data session with a local area network ("LAN") from a remote location, and simultaneously allows for voice conferences with a my dad of different people at other, different locations, all from the same remote location over a single telephone line. Such advantages are highly desireable for persons operating either in a remote office or in transit where access to telephone services may be limited.

As discussed in greater detail below, a system for simultaneously enabling a voice and a data session, in accordance with the present invention, has a first voice data modem, configured in accordance with the present invention, having: (1) a data port for connection to data terminal equipment, such as a personal computer; (2) a voice jack for connection to a telephone; (3) a telco jack for connection (through a single, first extension or line) to a first telecommunications network (or first network), such as the PSTN; and (4) a dial call progress unit coupled to the voice jack and the telco jack, which is capable of initiating, monitoring, and terminating a telephone call through either the voice jack or the telco jack. The first network may have a second extension of line, or the first network may be connected to another, second telecommunications network (or second network) having more than one telephone line or extension, such as a private branch exchange (PBX) typically found in most office environments. A second voice data modem, which is also configured in accordance with the present invention, has: (1) a data port for connection to other data terminal equipment; (2) a voice jack for connection to a first extension of the (first or second) network; (3) a telco jack for connection to a second, different extension of the (first or second) network; and (4) a dial call progress unit coupled to the voice jack and the telco jack, which is also capable of initiating, monitoring, and terminating a telephone call through either the voice jack or the telco jack. As mentioned above, the second extension (or line) may be directly available through the first network, such as the PSTN, or may be available through a second network, such as a PBX. Also as discussed in greater detail below, as a summary example, the first voice data modem at a first location may initiate (or receive) a simultaneous voice and data session, connected through its telco jack over a single, first network extension to a second voice data modem, which is also connected to the network through the telco jack through the first extension of the network. Once the connection has been established, the first voice data modem may initiate (or receive) a data session to (or from) data terminal equipment at a second location, such as an E-Mail or file server, connected through the TIA Interface (data port) of the second voice data modem. Simultaneously, a voice session to (or from) a telephone at the first location, connected through the voice jack of the first VDM, having been multiplexed with the data transmitted through the second VDM, is demultiplexed and routed through the voice jack of the second voice data modem over a second extension of the network to a telephone at a third location. When connected through the voice data modem and system of the present invention, the operator at the first location utilizing a first voice data modem may have simultaneous voice and data sessions, with operators or devices at more than one different remote location, over a single telephone line.

Figure 1:
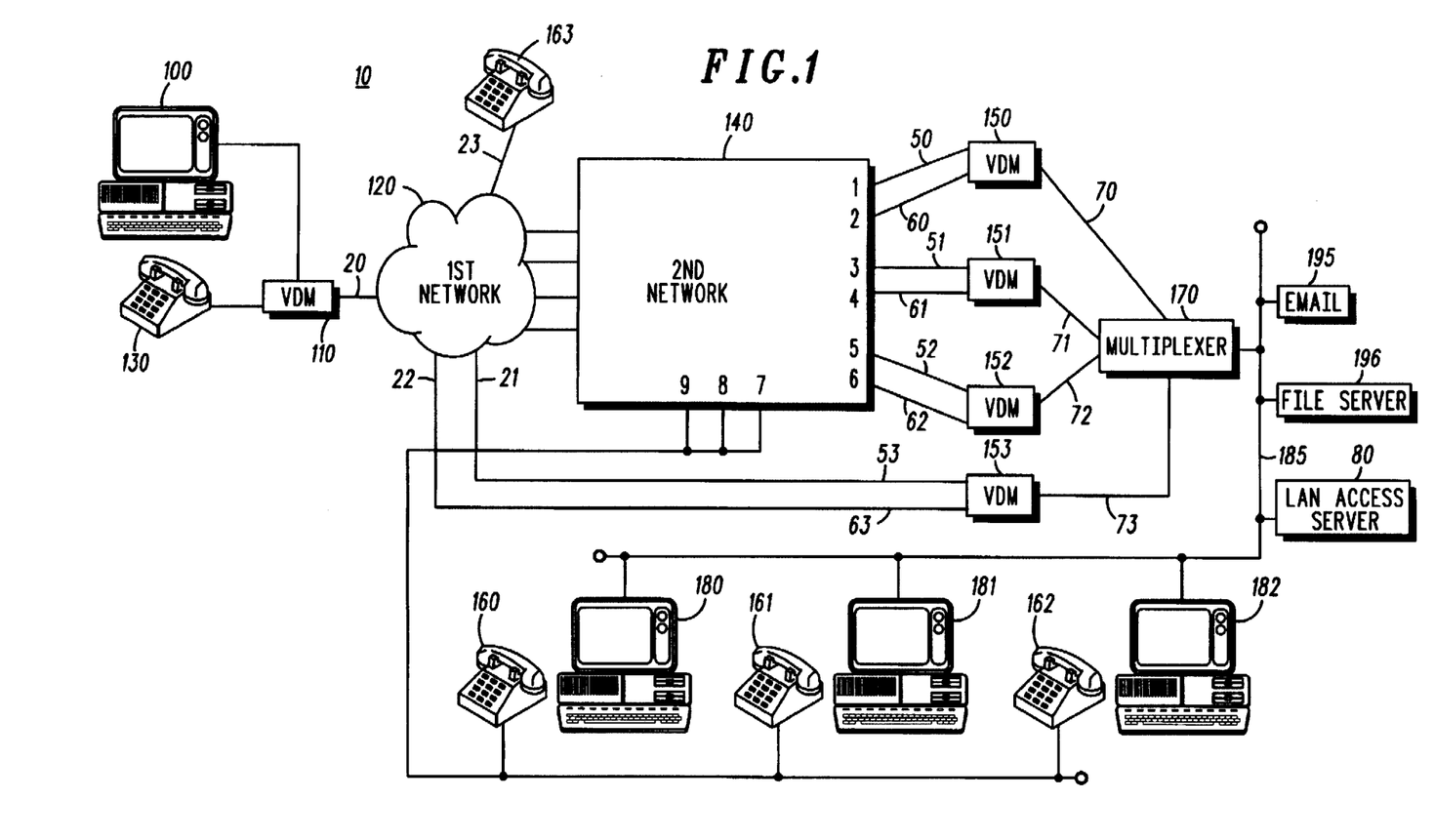
FIG. 1 is a diagram illustrating a voice data modem system for simultaneously enabling voice sessions and data sessions in accordance with the present invention.

Referring to FIG. 1, FIG. 1 is a diagram illustrating a voice data modem system 10 for simultaneously enabling voice sessions and data sessions in accordance with the present invention. Data terminal equipment (DTE) 100, such as a personal computer or a workstation, is connected to a first voice data modem (VDM) 110, typically through an RS232 interface. A first, local telephone 130 is connected through a voice jack to the VDM 110 for voice sessions. The first voice data modem 110 is in turn connected over a single telephone extension (or line) 20 to a first network 120, such as the public switched telephone network (PSTN) or a leased line network. The first network 120 switches calls that originate from (or are received by) the first VDM 110 to (or from) any one or more of the second, remote voice data modems 150, 151, and 152 through a second network 140 having more than one telephone line or extension, such as a private branch exchange (PBX). In addition, the first network 120 may also switch calls that originate from (or are received by) the first VDM 110 to (or from) other remote voice data modems, such as VDM 153, which is coupled to the first network via two extensions through remote modem telco jack 53 and remote modem voice jack 63.

The second network 140 may be connected to the first network 120 through any typical or standard arrangement, such as over standard network connections. In accordance with the present invention, each remote VDM 150, 151, 152 is connected to the second network through two different jacks, each of which in turn is coupled to a different extension (or line) of the second network 140. Continuing to refer to FIG. 1, remote modem telco jacks 50, 51, and 52 (corresponding respectively to each remote VDM 150, 151, and 152) are connected to corresponding extensions 1,3, and 5 of the second network 140, respectively, and each remote modem telco jack 50, 51, and 52 may be a terminus for a call to or from the second network 140 that is originated from or is to be received by the VDM 110. Remote modem voice jacks 60, 61, and 62 are connected to corresponding extensions 2, 4, and 6 of the second network 140. Telephone calls to remote telephones 160, 161, 162 and 163, for voice sessions, are placed through voice jacks 60, 61, 62 through corresponding extensions 2, 4, and 6, respectively, of second network 140. Similarly for VDM 153, as an additional system configuration in accordance with the present invention, remote modem telco jack 53 is connected to a first extension (or line) 21 of the first network 120, and remote modem voice jack 63 is connected to a second, different extension (or line) 22 of the first network 120. Remote telephones 160, 161, and 162 are connected to corresponding extensions 7, 8, and 9, respectively, of second network 140. Remote telephone 163 is connected via extension 23 to the first network 120 through any typical or standard connections, such as standard PSTN connections.

Corresponding remote modem data ports 70, 71, 72, and 73 of VDMs 150, 151, 152, and 153, respectively, are connected to a data multiplexer 170. Data multiplexer 170 is, in turn, connected to a local area network (LAN) 185 for accessing network services Such as an electronic mail (E-mail) server 195, a file server 196, a LAN access server 80, or other centralized or network services. Data multiplexer 170 may also be embodied within other devices, for example, within the the file server 196 or within the local area network access server 80 which may be, for example, a dialup router. In addition, VDMs 150, 151, 152, and 153, may also be embodied within other devices, for example, within the local area network access server 80 or the file server 196. DTEs 180, 181, and 182 are also connected to the LAN 185. The LAN 185 enables DTEs 180, 181, and 182 to also access E-mail server 195, LAN access server 80, or file server 196. For data sessions, local terminal 100 may access remote DTEs 180, 181, and 182, the E-mail server 195, the file server 196, the LAN access server 80, or other services of the network 185, through the data multiplexer 170. Other alternative system configurations are also available; for example, any of the remote modem data ports 70, 71, 72 and 73 could be directly coupled to DTEs, rather than connected to the LAN 185 through the multiplexer 170. In addition, the various operations of the LAN 185, the data multiplexer 170, the E-mail server 195, the file server 196, and the LAN access server 80 are well understood by those skilled in the art.

Continuing to refer to FIG. 1, as discussed in greater detail below, the operation of the voice data modem system 10 may be illustrated through an example. The first VDM 110 may establish a data session with the file server 196 by initiating a telephone call through the first network 120 and extension 1 of the second network 140, routed to the file server 196 via VDM 150 and multiplexer 170. The VDM 150 receives the call from VDM 110 via the remote telco jack 50, and routes the demodulated data through data port 70. The first VDM 110 may also establish a voice session with another location, through the use of various dial commands discussed below. The voice information will have been multiplexed (by VDM 110) with the data transmitted to VDM 150 over telco jack 50. A telephone call will be placed and the demultiplexed voice transmitted by the VDM 150 via modem voice jack 60 over a different extension of second network 140, such as extension 2, to the desired location, such as telephone 163 or telephone 160, which may be different from the location of the file server 196.

Alternatively, in another system embodiment, the first VDM 110 may establish a data session with the file server 196 by initiating a telephone call through extension 21 of the first network 120, routed to the file server 196 via VDM 153 and multiplexer 170. The VDM 153 receives the call from VDM 110 via the remote telco jack 53, and routes the demodulated data through data port 73. The first VDM 110 may also establish a voice session with another location, also through the use of various dial commands discussed below. The voice information will also have been multiplexed with the data transmitted to VDM 153 over telco jack 53. A telephone call will be placed and the demultiplexed voice transmitted by the VDM 153 via modem voice jack 63 over a different extension of the first network, such as extension 22, to the desired location, such as telephone 163 or telephone 160, either of which also may be different from the location of the file server 196.

As mentioned above, the telecommunications network also may be a leased line or other equivalent network. In such an environment, the multiplexed voice and data may be transmitted in a synchronous mode or an asynchronous mode. For an asynchronous mode, the multiplexed data may be flow controlled, for example, through RTS or CTS. For synchronous multiplexed voice and data, a user may want to provide for digital speech interpolation, such that given the "bursty" nature of voice transmission, when no voice is transmitted, data may be transmitted instead. Because synchronous data is not easily flow controlled, an average data rate for the data channel may be assumed and adequate data buffering may be provided, to avoid a potential loss of user data. Other known techniques, for example, protocol spoofing, may also be used if the data protocol is known.

Figure 2:
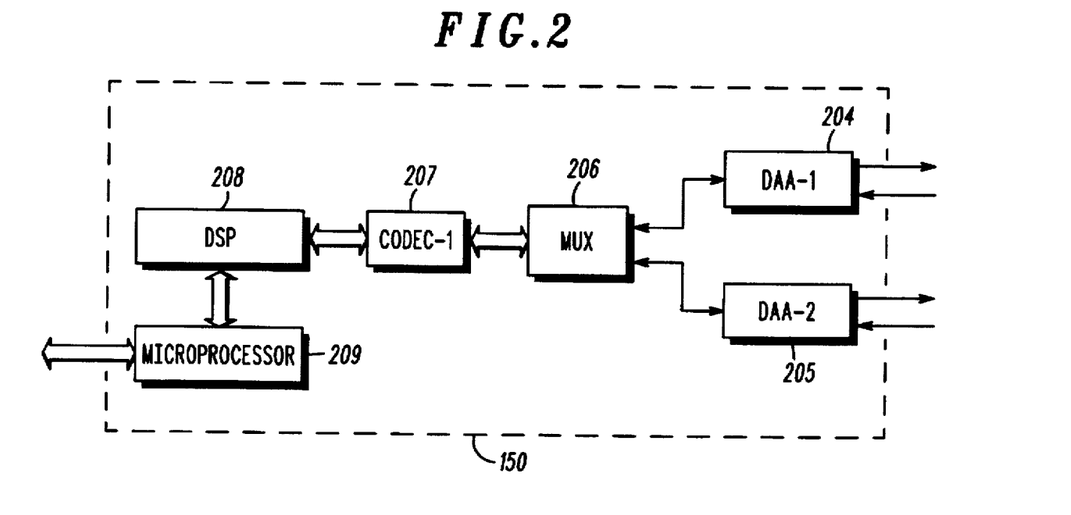
FIG. 2 is a block diagram illustrating a first embodiment of a voice data modem in accordance with the present invention.

FIG. 2 is a block diagram illustrating a first embodiment of a voice data modem 150 (and similarly, voice data modems 110, 151, 152 and 153) or other DCDs in accordance with the present invention. Not shown in FIG. 2, the voice data modem 150 (and similarly, voice data modems 110, 151, 152 and 153) is coupleable to a DTE 100, such as a computer, or to a data multiplexer 170, through an interface 255, such as a TIA interface (illustrated in FIG. 4 below). Continuing to refer to FIG. 2, within the voice data modem 150, a first dial (or data) access arrangement 204, known as a "DAA" and referred to as first DAA 204 (or DAA-1 204), is coupleable to a voice jack, such as voice jack 50, to receive or transmit an analog signal, such as analog speech or data. DAAs are known in the prior art and may be made of a variety of discrete components, including analog multiplexers, resistors, capacitors, hybrid circuitry, and operational amplifiers, or may be embodied in whole or part as an integrated circuit, and performs such functions as impedance matching, two to four wire interconversion, surge protection, and power level adjustment. In addition, in the preferred embodiment, the first DAA 204 has additional circuitry and programming for detecting a telephone going off hook (a telephone which may be connected through the voice jack 50) and supplying ringing current to such a connected telephone. The first DAA 204 also has additional circuitry and programming to detect a telephone extension (or line) connection, to avoid providing such ringing current when other functions (such as dialing a remote telephone) may be desired. The voice data modem 150 also contains a second dial (or data) access arrangement 205 (referred to as second DAA 205 or DAA-2 205) for connection to a telco jack 51. The second DAA 205 does not require any additional detection and ringing circuitry and programming for connection to a telephone via a voice jack. Rather, in the preferred embodiment, the second DAA 205 is coupleable to a telco jack 51 for connection, for example, to the second network 140. Typically connected to the first DAA 204 and second DAA 205 is a multiplexer or other switching arrangement 206, which in turn is connected to a first coder-decoder (known and referred to as a "codec") 207 (also referred to as codec-1 207). Equivalently to the use of codec-1 207, an analog-to-digital and digital-to-analog converter, also referred to herein as an A/D converter, such as an SGS Thompson ST 7544 or ST 7545) may be used. The first codec 207 converts an analog signal received from a channel such as a telephone line to sampled, digital form, and converts sampled, digital information to analog form for transmission over the channel. The first codec 207 is then connected to a digital signal processor ("DSP") 208, such as a Motorola MC56002 or MC56166. The DSP 208 is used in a first embodiment of the invention herein, performing the various functions described in detail below. The DSP 208 is connected to a microprocessor 209, such as a Motorola M68302, which may be coupled through an interface 255 (not shown) to a DTE or network, such as DTE 100 or network 185, to transmit and receive digital information. The DSP 208 and microprocessor 209 each contain a set of program instructions which, when executed, perform the various functions described below with reference to FIGS. 4–8. The multiplexer 206 may also be incorporated and controlled within the DSP 208, or incorporated using standard available components (such as an analog Mux) and controlled by the microprocessor 209, and is utilized to provide switching of signals between the first DAA 204 and the second DAA 205 to, for example, route a demultiplexed data signal through the second DAA 205 (to a DTE) and route a demultiplexed voice signal through first DAA 204 (to a telephone). As another alternative, in lieu of utilizing the multiplexer 206, a second codec may be utilized, as illustrated in FIG. 3.

Figure 3:
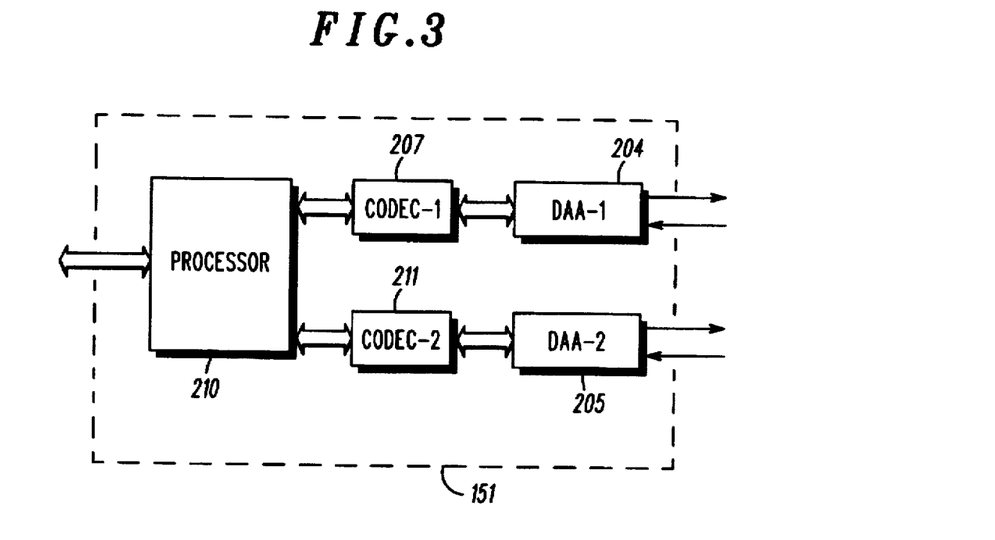
FIG. 3 is a block diagram illustrating a second embodiment of a voice data modem in accordance with the present invention.

FIG. 3 is a block diagram illustrating a second embodiment of a voice data modem 151 (and similarly, voice data modems 110, 150, 152 and 153) or other DCDs in accordance with the present invention. Referring to FIG. 3, the first DAA (DAA-1) 204, the second DAA (DAA-2) 205, and the first codec 207 perform the same functions and may be the identical components, as previously discussed with reference to FIG. 2. In lieu of the multiplexer 206, the VDM 151 includes a second codec 211 (codec-2 211 ) connected to DAA-2 205, which may be an identical component and performs the same functions as the first codec 207. Both the first codec 207 and second codec 211 are connected to the processor 210. Also in contrast with the modem 150 of FIG. 2, however, FIG. 3 illustrates a voice data modem or other DCE, such as voice data modem 151, containing a processor 210, such as a Motorola M68356, which performs the functions of both the DSP 208 and the microprocessor 209 of FIG. 2. The processor 210 is used in a second embodiment of the invention herein, also containing a set of program instructions which, when executed, perform the various functions described below with reference to FIGS. 4–8. The processor 210 may also be coupled through an interface 255 (not shown) to a DTE or network, such as DTE 100 or network 185, to transmit and receive digital information. As a consequence of the interchangeability of a processor with a DSP and a microprocessor in these various embodiments, the terms "processor arrangement", DSP and processor (or microprocessor) are used interchangeably and inclusively herein, such that use of one term may be interpreted to mean and include the various other processor embodiments. For example, a "processor arrangement" may mean DSP 208 coupled to microprocessor 209 in FIG. 2, or processor 210 in FIGS. 3 and 4. Also as discussed with reference to FIG. 2, a single codec, such as first codec 207 may be utilized and arranged with a multiplexer 206, and the multiplexer 206 may also be incorporated within the processor 210.

Figure 4:
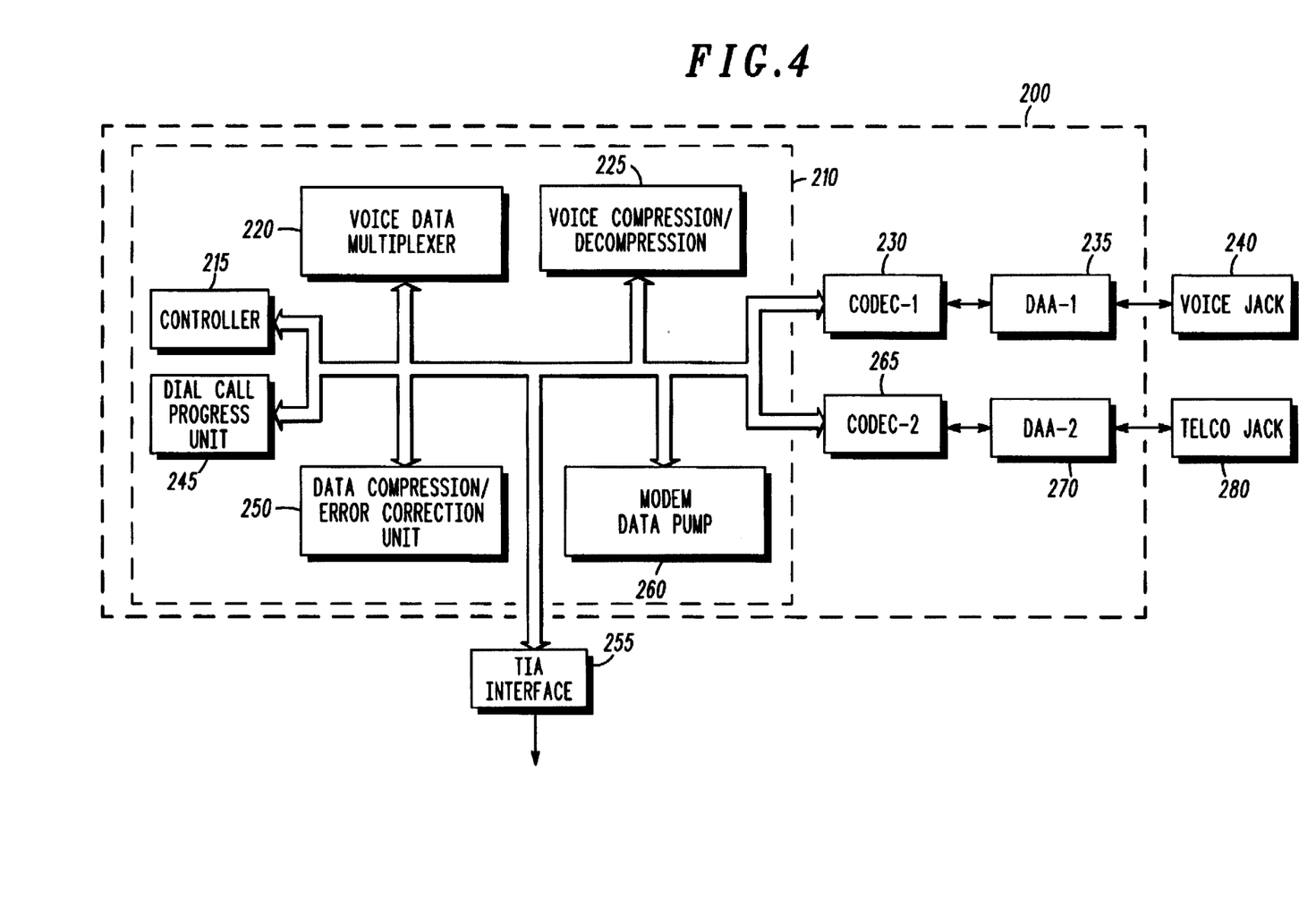
FIG. 4 is a detailed block diagram illustrating an embodiment of a voice data modem in accordance with the present invention.

FIG. 4 is a detailed block diagram illustrating the operational or functional blocks of an exemplary embodiment of a voice data modem 200, such as VDMs 110, 150, 151, 152 and 153 of FIG. 1, in accordance with the present invention, and utilized in the voice data modem system described above. Referring to FIG. 4, in the VDM 200, a controller 215 controls the operation of the other operational units of the VDM 200. These other operational units are a voice data multiplexer 220, a voice compression/decompression unit 225, a first dial (or data) access arrangement (DAA-1) 235 (also referred to as a voice DAA 235) that interfaces the VDM 200 to a telephone or a telephone extension (through a voice jack 240), a dial call progress unit 245, a modem data pump 260, a data compression and error correction unit 250, and a second dial (or data) access arrangement (DAA-2) 270 (also referred to as a modem DAA 270) which interfaces the VDM 200 to a telephone extension (through telco jack 280). As illustrated in FIGS. 2 and 3, the controller 215 and many of these operational blocks (220, 225, 245, 260, and 250) are preferrably embodied in a processor arrangement, such as processor 210 or a processor 209 with a DSP 208. Also illustrated in FIG. 4 are two separate codecs, a first codec 230 and a second codec 265, which as previously illustrated may be combined into one codec (such as codec 207) with a multiplexer or other switching arrangement 206. The first codec 230 is connected to a first (voice) DAA (DAA-1) 235, which is further coupleable to a voice jack 240 for voice input and output through a telephone or a telephone line (or extension). The second codec 265 is connected to a second (modem) DAA (DAA-2) 270, also coupleable to a telephone line (or extension) via a telco jack 280. Data terminal equipment is connected to the terminal interface adapter (TIA) 255, or, equivalently, through an RS232 interface. Depending upon the modem embodiment, such as a stand alone modem, a PCMCIA card, or as a PC card, the various interfaces such as voice jack 240, telco jack 280, and TIA interface 255, may or may not be included within the modem. For example, in a modem implemented as a card within a personal computer, the various interfaces may be located in the computer, rather than in the modem card. As discussed in detail below, VDM 200 allows for simultaneous voice and data sessions, to (or from) the same or different locations, over a single telephone line connected to the telco jack 280.

Continuing to refer to FIG. 4, the operation of the VDM 200, in accordance with the present invention, may vary depending upon whether the VDM 200 is operating as a "terminus" VDM (first case) or as an "intermediate" VDM. In the first case, as a terminus VDM, such as VDM 110 in FIG. 1, the VDM 200 may be in either a remote or local location, and is terminal node in the sense that it is directly connected to a network (PSTN) extension, a telephone, and a DTE (or LAN), for direct utilization by the user. In the second case, in contrast, in which the VDM 200 is operating as an intermediate VDM, such as VDMs 150, 151, 152 and 153 of FIG. 1, which also may be in either a local or remote location, the VDM 200 is connected to a DTE, a LAN (such as through a multiplexer) or other computer network connections, and to two telecommunications network (telephone) extensions (or lines), one telecommunications network extension to receive or transmit multiplexed voice and data, and the second telecommunications network extension to additionally route a voice session from another VDM (such as a terminus VDM) to a third location, as discussed in greater detail below.

Operating in the first case as a terminus VDM in FIG. 4, the VDM 200 would typically be connected to a telephone (for a voice session) through the voice jack 240, connected to a DTE through the TIA (or RS232) interface 255, and connected to a telecommunications network extension (telephone line) for multiplexed data and voice transmission through the telco jack 280. First, to originate a call, the telephone number is sent to the dial call progress unit 245 by the controller 215. The controller 215 also instructs the DAA-2 (modem DAA) 270 to go off hook. After the reception of a dial tone, the dial call progress unit 245 dials the telephone number using either a pulse dialing technique or DTMF. After the normal call progress tone, ringing followed by an answer back tone is detected by the dial call progress unit 245 of the local VDM 200. The controller 215 then instructs the modem data pump 260 to start communication with a remote VDM (not shown in FIG. 4) using, for example, a V.34 modulation technique. If the remote VDM responds with the V.34 training sequence (or other modulation sequence), then both VDMs train and enter data mode. At that time, voice communications may commence, input through a telephone via voice jack 240, and as discussed below, is multiplexed with data, and transmitted through DAA-2 270 via the telco jack 280, utilizing a voice data multiplexing methodology as mentioned above, such as the International Telecommunications Union (ITU) standard H.324 and the sub-specifications thereto.

The data from a DTE or computer network (such as a LAN) is input through the TIA interface 255 and passed to the data compression/error correction unit 250 for further processing. Typically, the data is compressed and formed into data packets. The voice is typically input through a telephone (not shown) connected to the voice jack 240. Voice jack 240 is operably coupled to the voice DAA-1 235 that, as mentioned above, performs functions such as a 2-to-4 wire conversion. Voice DAA-1 235 is connected to first codec 230 that transforms the analog voice signal into digital samples. The digital samples are then processed by the voice compression/decompression unit 225. The voice compression/decompression unit 225 compresses the digital samples and forms voice packets to be multiplexed with the data packets by the voice data multiplexer 220. The voice data mulitplexer 220 then forwards the multiplexed voice and data packets to the transmitter of the modem data pump 260. The modem data pump 260 modulates and converts the multiplexed voice and data packets to an analog signal for transmission to the remote VDM. The modem data pump 260 is connected to a second codec 265 to perform the digital-to-analog conversion, which is connected to a second DAA (DAA-2) 270 (also referred to as a modem DAA-2 270) that performs the 2-to-4 wire conversion and interfaces to the telecommunications network extension. VDM 200 is connected to a telecommunications network, such as the PSTN, through the telco jack 280, for simultaneous voice and data transmission and reception over a single network extension.

Conversely, to receive a call (also in the first case as a terminus VDM), another VDM, such as a remote VDM, transmits multiplexed voice and data packets over a single telephone line to the VDM 200 (correspondingly operating as a local VDM) as analog signals appearing at the telco jack 280. The signal is then converted by the second codec 265 to form a digital signal that is provided to the receiver of the modem data pump 260. The modem data pump 260 then demodulates the digital signal and forms a bit stream that is then forwarded to the voice data multiplexer 220. The voice data multiplexer 220 then demultiplexes the bit stream into the separate voice and data packets. The voice packets are sent to the voice compression/decompression unit 225 for decompression, and the (digital) decompressed voice is then forwarded to the first codec 230 to be transformed into an analog signal that is sent to a telephone via voice jack 240. The data packets are provided to the data compression/error correction unit 250 for decompression and error correction, and then forwarded to the data terminal equipment through the TIA interface 255. In the preferred embodiment, the ITU V.42 bis standard is utilized by the data compression/error correction unit 250.

Continuing to refer to FIG. 4, the reception of a call (through telco jack 280) is usually signaled by a ringing tone forwarded to the dial call progress unit 245. Once the dial call progress unit 245 has determined that it is a valid ring, it informs the controller 215. The controller 215 then instructs the modem DAA-2 270 to go off hook and instructs the modem data pump 260 to commence training by typically transmitting an answer back tone, with further operation occurring as described above. The local and remote VDMs may also exchange certain proprietary information through the use of a secondary data channel under the control of the controller 215 (or through another logical data channel used as a control channel that is multiplexed along with the voice and data streams), as explained in more detail below. VDM 200 also contains many other standard interchange circuits and other voice quality enhancing circuits that are well known by persons skilled in the art and hence not described in detail. Controller 215 may be implemented in a 68302 microprocessor. The modem data pump 260 may be implemented using a MC 56002 DSP. The voice compression/decompression unit 225 may be implemented using an MC56166 DSP. All relevant memory, digital and analog support circuitry necessary to support the various processors may also be used.

In summary, FIGS. 2–4 illustrate a voice data modem (such as VDMs 200, 110, 150, 151, 152, and 153) for simultaneous voice and data sessions over a telecommunications network, the telecommunications network having a plurality of network extensions, with the plurality of network extensions including a first network extension and a second network extension. The voice data modem then comprises, first, a first dial access arrangement (204, 235) coupleable to a first telecommunications jack (240); second, a second dial access arrangement (205, 270) coupleable to a second telecommunications jack (280) for a second telecommunications connection over a second network extension; third, a switching arrangement (206) connected to the first dial access arrangement and to the second dial access arrangement; fourth, a codec (207) connected to the switching arrangement; fifth, a digital signal processor (208) connected to the codec; and sixth, a microprocessor (209) connected to the digital signal processor, the microprocessor further coupleable to an interface (255) for connection to data terminal equipment for data transfer over the telecommunications network.

Also in summary, in another embodiment illustrated in FIGS. 3 and 4, the voice data modem (such as VDMs 200, 110, 150, 151, 152, and 153) comprises: a first dial access arrangement (204, 235) coupleable to a first telecommunications jack (240) for a first telecommunications connection over a first network extension for voice transmission; a first codec (207, 230) connected to the first dial access arrangement (204, 235); a second dial access arrangement (205, 270) coupleable to a second telecommunications jack (280) for a second telecommunications connection over a second network extension for multiplexed voice and data transmission; a second codec (211,265) connected to the second dial access arrangement (205, 270); and a processor arrangement (210, or 208 and 209) connected to the first codec (207, 230) and to the second codec (211, 265), and further coupleable to an interface (255) for connection to data terminal equipment for data transfer over the telecommunications network.

In addition, in the voice data modem, the microprocessor or processor arrangement may further comprise a dial call progress unit. As discussed in greater detail below, in the preferred embodiment, the microprocessor or processor arrangement is responsive to generate dial commands to a second voice data modem, is responsive to monitor a secondary channel or an embedded control channel for an answering modem identification, and is responsive to monitor the progress of simultaneous voice and data sessions. Also in the preferred embodiment, the microprocessor or processor arrangement is responsive to determine the cessation of a voice session and terminate a corresponding simultaneous data session subsequent to the cessation of the voice session, and is responsive to determine the cessation of a data session and terminate a corresponding simultaneous voice session subsequent to the cessation of the data session.

Figure 5:
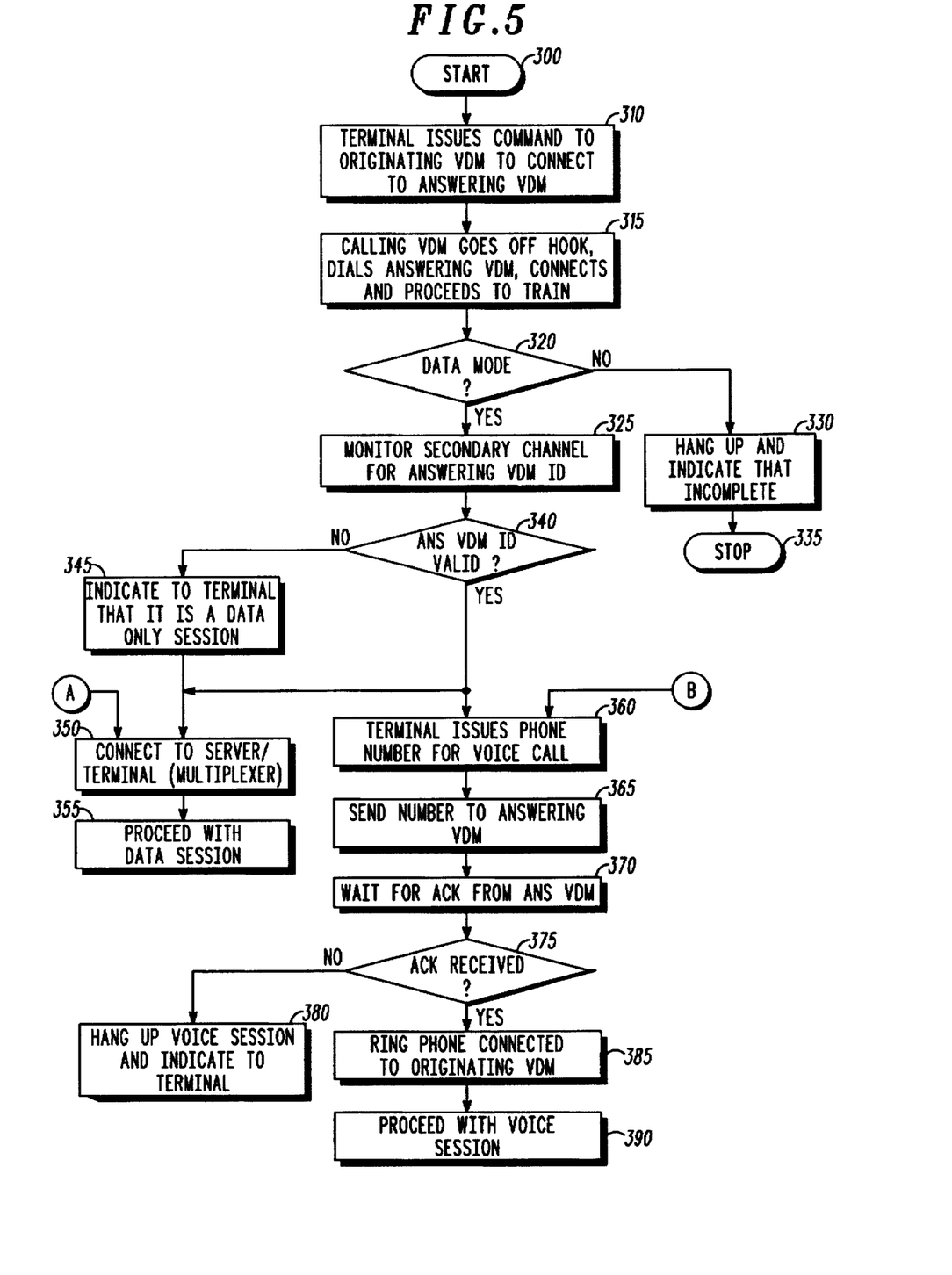
FIG. 5 is a flow chart illustrating call set up procedures by an originating voice data modem in accordance with the present invention.
Figure 6:
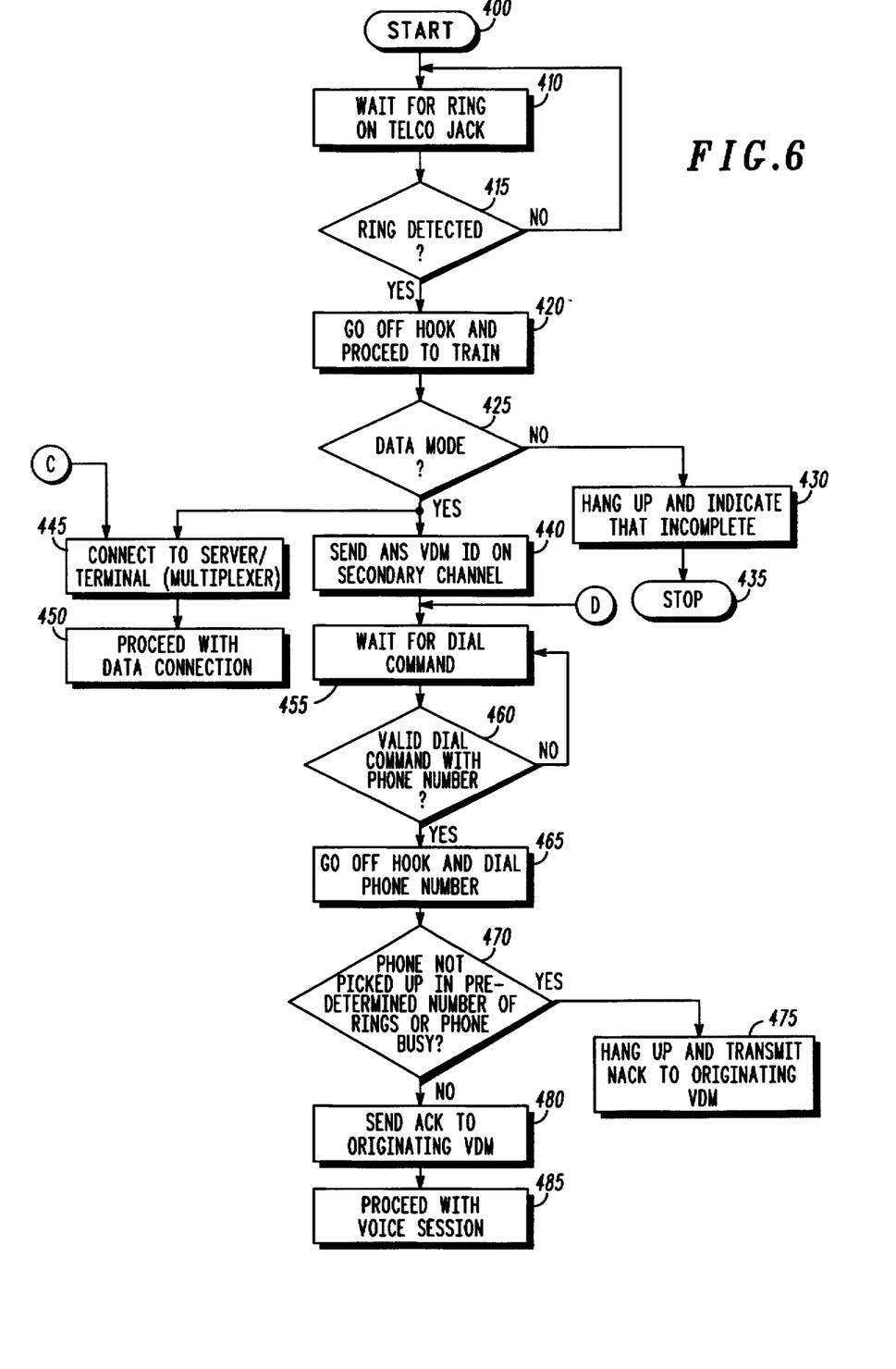
FIG. 6 is a flow chart illustrating call answering by an answering voice data modem in accordance with the present invention.

The second case, in which the VDM 200 is operating as an intermediate VDM, such as VDMs 150, 151, 152 or 153 in the system of FIG. 1, additionally routing a voice from (or to) another VDM (such as a terminus VDM) to (or from) a third location, is explained in detail below with reference to FIGS. 5 and 6. FIG. 5 is a flow chart illustrating call set up procedures by an originating (or calling) voice data modem in accordance with the present invention. Such an originating VDM would typically be a terminus VDM such as VDM 110 of FIG. 1. FIG. 6 is a flow chart illustrating call answering by an answering voice data modem in accordance with the present invention. Such an answering VDM may be an intermediate VDM, such as VDMs 150, 151, 152 and 153 of FIG. 1, but may also be a terminus VDM, depending upon the circumstances.

Referring to FIG. 5, the controller 215 of the originating VDM begins the call set up procedures, start step 300. In this example, the data terminal equipment connected to the originating VDM issues a command to connect to a remote VDM, step 310, and provides any relevant telephone number. The originating VDM then goes off hook and dials the remote VDM using the dial call progress unit 245 and proceeds with training protocols, step 315. Correspondingly, referring to FIG. 6, in substantially the same time period, the answering VDM also begins the call answering procedures, start step 400, and waits for a ringing signal on the telco jack, step 410. If a valid ring is not detected, step 415, the answering VDM returns to step 410 and continues to wait for a ringing signal. If a valid ring is detected, step 415, the controller 215 in the answering VDM instructs the DAA-2 270 to go off hook, and also instructs the modem data pump 260 to proceed with training protocols, step 420.

At this stage of both processes illustrated in FIGS. 5 and 6, both the originating VDM (such as VDM 110 of FIG. 1) and one of the answering VDMs (such as VDMs 150, 151, 152 or 153 of FIG. 1, configured in accordance with VDM 200 of FIG. 4) are preparing to communicate data. If both originating and answering VDMs achieve data mode (FIG. 5, step 320, and FIG. 6, step 425, respectively), an exchange of further capabilities and negotiations (such as for data rate in V.34) followed by data transmission will commence, as discussed in greater detail below. If data mode has not been achieved, the originating and answering VDMs hang up (terminate the call), and indicate to their respective data terminal equipment that the connection was incomplete (FIG. 5, step 330, and FIG. 6, step 430, respectively). The software program resident in the controller 215 then enters a stopped state (FIG. 5, step 335, and FIG. 6, step 435, respectively). If the originating and answering VDMs successfully train and reach data mode (FIG. 5, step 320, and FIG. 6, step 425, respectively), the answering VDM transmits a predetermined identification to the originating VDM on a secondary data channel or an embedded control channel (FIG. 6, step 440), and the originating VDM monitors the secondary data channel, an embedded control channel, or some other auxiliary channel which is non-invasive to the main channel utilized for voice and data, for an identification transmitted by the answering VDM (FIG. 5, step 325). Such auxiliary or secondary channels, or embedded control channels, for example, are specified in International Telecommunications Union (ITU) Recommendations V.34, H.324, and H.320. The originating VDM then determines whether the identification from the answering VDM is valid (FIG. 5, step 340). These identification procedures are utilized in the present invention to determine whether the answering device is capable of supporting the additional features required to generate the voice data conferencing system of the present invention. This identification is typically sent back from the controller of the answering VDM to be interpreted by the controller of the originating VDM using the data pump's secondary data channel or through an embedded control channel.

If the identification is valid, indicating that the capacity or capability exists for simultaneous voice/data sessions (FIG. 5, step 340), the terminal (DTE) then provides or issues the telephone number of the remote telephone to be called (FIG. 5, step 360), such as the number for any of the remote telephones 160, 161, 162 or 163 illustrated in FIG. 1. Any of these remote telephones 160, 161, 162 or 163 illustrated in FIG. 1 may be in a third location, i.e., a location different from the location of the local VDM (a first location) and from the location of the answering (or intermediate) VDM (a second location). Continuing to refer to FIG. 5, the originating VDM then transmits the telephone number to the intermediate VDM along with a dialing command (FIG. 5, step 365). The originating VDM then waits for an acknowledgment signal from the answering VDM (FIG. 5, step 370).

During this time period, the answering VDM, having previously sent a predetermined identification to the originating VDM (FIG. 6, step 440), has been waiting to receive a dialing command from the originating VDM (FIG. 6, step 455). Once the dial command has been received, the answering VDM determines the validity of the command and the phone number (FIG. 6, step 460). If the command and the phone number am invalid in step 460, the answering VDM returns to step 455 and waits for a another dial command. If the command and the phone number are valid in step 460, the answering VDM then proceeds to go off hook and dial the telephone number, using the dial call progress unit 245 and the controller 215 (FIG. 6, step 465). This call may be routed through any network having a second extension coupleable through the voice jack 240 to the DAA-1 235 of the answering VDM, such as VDM 150 of FIG. 1 or VDM 200 of FIG. 4. The network may be, for example, the second network 140, such as a PBX, or the first network 120, such as the PSTN, illustrated of FIG. 1. As indicated in FIG. 2, the answering VDM, such as VDM 200, may receive a multiplexed voice and data communication via the telco jack 280 coupleable to the DAA-2 (modem DAA) 270, then transmit the demodulated data to a DTE at a first location via the TIA interface 255, and transmit the demultiplexed voice information to a telephone at a second location via the DAA-1 235 coupleable to a voice jack 240 connected to a second extension (the second line or extension being one other than the line or extension coupled to the telco jack 280). Continuing to refer to FIG. 6, in response to the dial command, the controller 215 of the answering VDM instructs the DAA-1 235 to go off hook, further issues the phone number to be dialed to the dial call progress unit 245 and issues the dial command. The dial call progress unit 245 then dials the telephone number (via DAA-1 235 coupled to the voice jack 240) for the specified remote telephone, FIG. 6, step 465, such as remote telephones 160, 161, 162 or 163 of FIG. 1. If the remote telephone is not busy and is answered in within a predetermined number of rings, such as five rings or less, FIG. 6, step 470, the answering VDM (such as VDM 150 in FIG. 1) transmits an acknowledgement signal (ACK) to the originating VDM (FIG. 6, step 480). Having waited to receive an acknowledgement signal from the answering VDM (FIG. 5, step 370,) if an ACK is received by the originating VDM (FIG. 5, step 375), then the originating VDM sends a ringing signal to the local (originating) telephone, such as telephone 130 in FIG. 1 (FIG. 5, step 385). This signal commands the local telephone to generate an audible ringing tone to indicate that the voice session can now commence. Both the originating and the answering VDMs may now proceed with the voice session (FIG. 5, step 390, FIG. 6, step 485). If the phone is not answered in step 470, however, the answering VDM terminates the connection (hangs up the call) to the remote telephone, via the voice jack 240, and sends a negative acknowledgment signal (NAK) to the originating VDM (FIG. 6, step 475).

Continuing to refer to FIGS. 5 and 6, if the originating VDM has determined that the remote VDM identification is not valid (FIG. 5, step 340), such that the answering VDM does not have the capacity to support both voice and data sessions to or with potentially different locations, the originating VDM then indicates to the local terminal, such as DTE 100, that simultaneous voice and data sessions to different locations are not possible, and that only a data session is possible (FIG. 5, step 345). The originating VDM then proceeds to connect to a system multiplexer, a local area network server or any other remote device connected for data transfer (FIG. 5, step 350), and proceeds with a data session (FIG. 5, step 355). If the remote VDM identification is valid (FIG.5, step 340), the local VDM also connects to the remote device for data transfer (FIG. 5, step 350), and proceeds with a data session (FIG. 5, step 355) while simultaneously having a voice session (FIG. 5, step 390). At the same time, the answering VDM also having determined that it has reached data mode (FIG. 6, step 425), in parallel with the steps of transmitting the answering VDM identification (FIG. 6, step 440) and other following voice session procedures discussed above, the answering VDM also connects to the remote device (FIG. 6, step 445) and proceeds with the data session (FIG. 6, step 450). As indicated in the discussion above, an originating voice data modem 200, such as VDM 110 illustrated in FIG. 1, may utilize an answering VDM 200 (such as VDMs 150, 151, 152 and 153 of FIG. 1 ), as an intermediary to demultiplex the combined voice and data from the single network extension (telephone line), and transmit (or retransmit) each voice and data session independently of the other, for example, to different locations.

In summary, FIGS. 5 and 6 disclose a method for enabling a simultaneous voice session and a data session over a single network extension or line connection, via a plurality of voice data modems, the simultaneous voice session and data session occurring between and among a plurality of locations, the plurality of voice data modems including a local voice data modem and an intermediate voice data modem, with the data session to occur between first data terminal equipment connected to the local voice data modem and second data equipment connected to the intermediate voice data modem. The method then comprises: (a) establishing a first telecommunications connection between the local voice data modem at a first location of the plurality of locations and the intermediate voice data modem at a second location of the plurality of locations (FIG. 5, steps 300, 310 and 315; FIG. 6, steps 400, 410, 415, and 420); (b) commencing training procedures to establish a data mode between the local voice data modem and the intermediate voice data modem (FIG. 5, steps 315 and 320; FIG. 6, steps 420 and 425); (c) determining the capacity of the local voice data modem and the intermediate voice data modem to have simultaneous voice and data sessions (FIG. 5, steps 325 and 340; FIG. 6, steps 440 and 455); (d) when the capacity exists for the local voice data modem and the intermediate voice data modem to have simultaneous voice and data sessions, establishing a second telecommunications connection between the intermediate voice data modem and a remote telephone at a third location of the plurality of locations and proceeding with a voice session between a telephone connected to the local voice data modem and the remote telephone (FIG. 5, steps 360,365, 370,375, 385, and 390; FIG. 6, steps 460, 465, 470, 480, and 485); and (e) when data mode has been established between the local voice data modem and the intermediate voice data modem, proceeding with a data session between the first data terminal equipment connected to the local voice data modem and the second data terminal equipment connected to the intermediate voice data modem (FIG. 5, steps 350 and 355; FIG. 6, steps 445 and 450). In addition, in the preferred embodiment, the method may also include the following steps, mentioned above with respect to FIGS. 1–4: (f) when both a data mode has been established between the local voice data modem and the intermediate voice data modem and a second telecommunications connection has been established between the intermediate voice data modem and a remote telephone at a third location, the local voice data modem transmitting multiplexed voice and data to the intermediate voice data modem; (g) the intermediate voice data modem demultiplexing the multiplexed voice and data; (h) the intermediate voice data modem demodulating the data and transmitting the data to the second data terminal equipment; and (i) the intermediate voice data modem demodulating the voice and transmitting the voice to the remote telephone.

Figure 7:
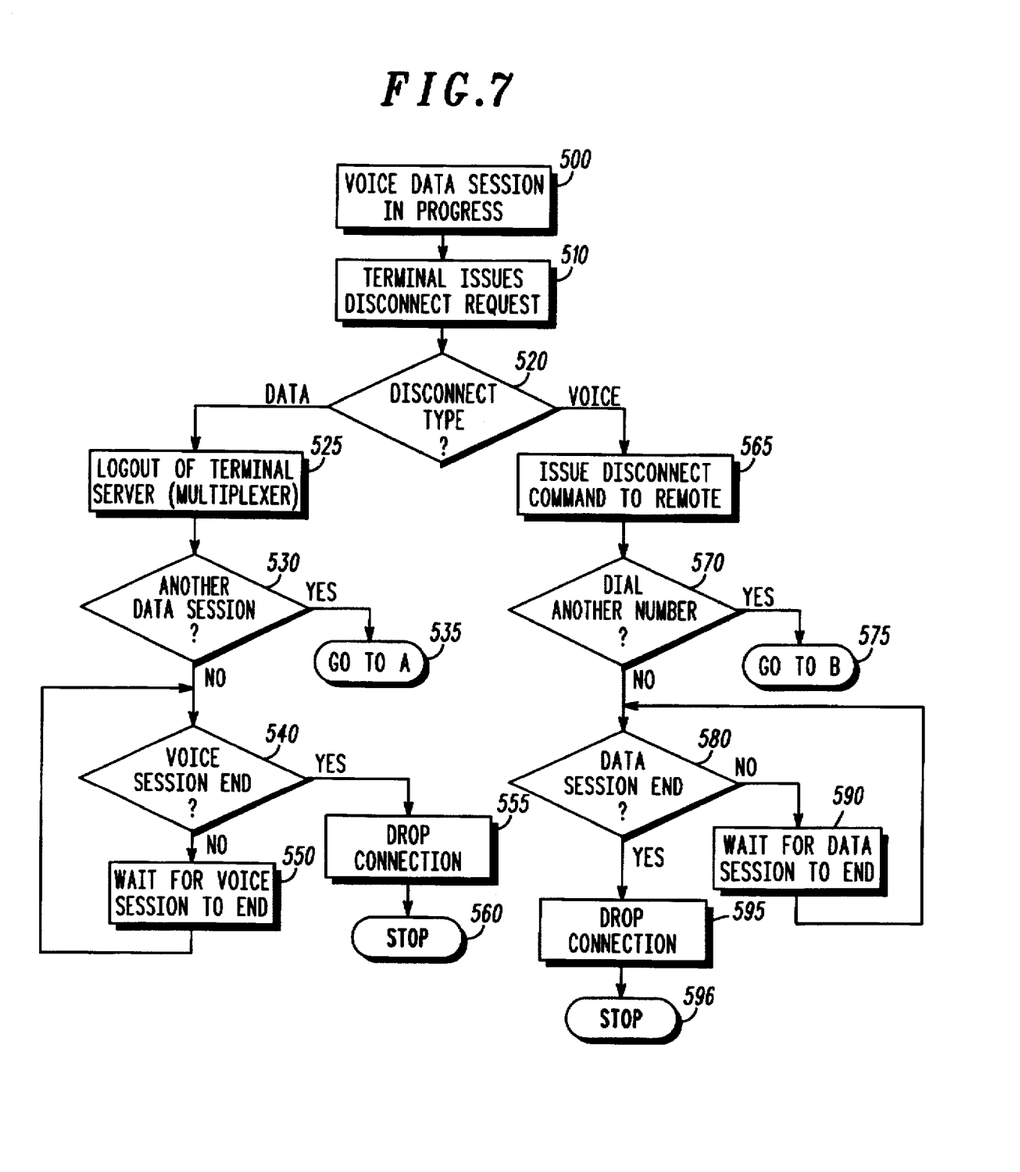
FIG. 7 is a flow chart illustrating the disconnection sequence for the originating (calling) voice data modem in accordance with the present invention.
Figure 8:
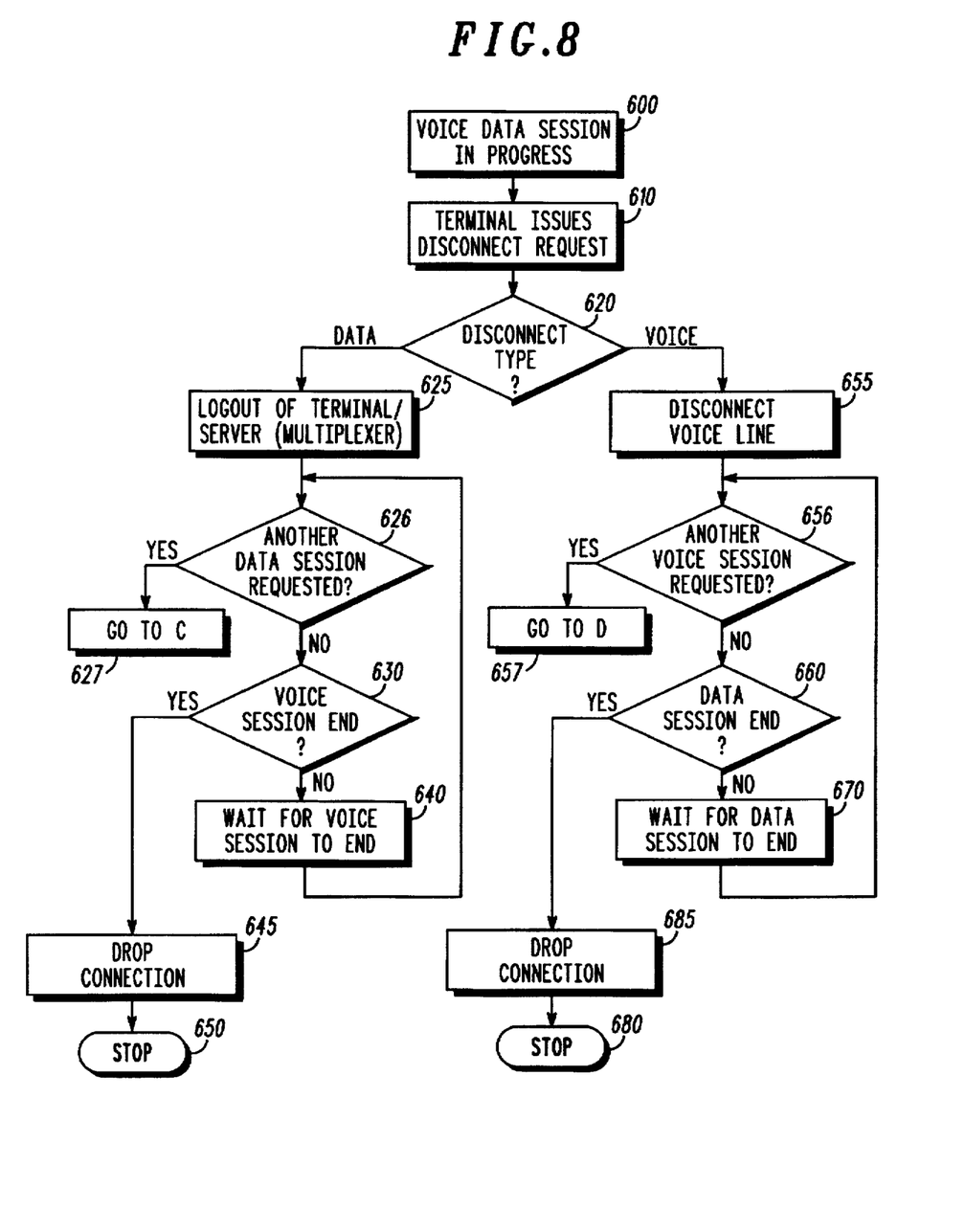
FIG. 8 is a flow chart illustrating the disconnection sequence for the answering voice data modem in accordance with the present invention.

Referring now to FIGS. 7 and 8, FIG. 7 is a flow chart illustrating the disconnection sequence for the originating (calling) voice data modem in accordance with the present invention, and FIG. 8 is a flow chart illustrating the disconnection sequence for the answering voice data modem in accordance with the present invention. For both FIGS. 7 and 8, the originating and the answering VDMs are assumed to be in the process of simultaneously communicating with both voice and data sessions (FIG. 7, step 500, FIG. 8, step 600). These disconnection sequences are provided because both the originating and answering VDMs have two active channels (multiplexed voice and data), and the state of both channels should be determined before the connection may be dropped, to avoid a termination of one channel from interfering with ongoing transmission in another channel. In the event the VDMs are not in the process of having simultaneous voice and data sessions, then the VDMs may disconnect using any known method.

To begin the disconnection sequence, a disconnection for voice, for data or for both voice and data, is requested from the originating terminal (DTE) (FIG. 7, step 510, FIG. 8, step 610 ). The disconnection request may be input from the user, for example, from a user interface of the DTE or by hanging up the connected telephone. The originating VDM and the answering VDM then determine what type of disconnection has been requested, for the voice session, for the data session, or for both (FIG. 7, step 520, FIG. 8, step 620). If the request is for disconnecting the data session, then the originating and answering VDMs follow the indicated path for DATA and then the user proceeds to log out of the connected terminal, such as a terminal sewer or multiplexer (FIG. 7, step 525, FIG. 8, step 625). If the request is for disconnecting the voice session, then the originating and answering VDMs follow the indicated path for VOICE and the VDMs proceed to disconnect the voice connection or line (FIG. 7, step 565, FIG. 8, step 655). If the disconnection request is for both the data and voice sessions, then the originating and answering VDMs follow both the indicated DATA and VOICE paths, also proceeding with the logout and disconnection steps (FIG. 7, steps 525 and 565, FIG. 8, steps 625 and 655).

As indicated in the DATA path illustrated in FIGS. 7 and 8, if another data session is requested by the originating VDM (step 530), then the method proceeds to the data connection step, step 350 of FIG. 5 ("GO TO A") (FIG. 7, step 535). If another data session is not requested in step 530, then the originating VDM determines if the voice session is in progress (FIG. 7, step 540). If the voice session has not ended, then the originating VDM waits for the voice session to end prior to terminating the connection (FIG. 7, step 550). Correspondingly, after logging out of the terminal server (FIG. 8, step 625), the answering VDM determines if another data session has been requested (FIG. 8, step 626). If another data session has been requested in step 626, the answering VDM also proceeds with data connection steps, FIG. 8, step 627, ("GO TO C"), returning to step 445 of FIG. 6. If another data session is not requested in step 626, the answering VDM also determines whether the voice session has ended (FIG. 8, step 630). If the voice session has not ended, the answering VDM waits for the voice session to end (FIG. 8, step 640), and for both originating and answering VDMs, the process continues until the voice session has ended, returning to steps 540 and 626, respectively. Once the voice session has also ended (FIG. 7, step 540, FIG. 8, step 630), the originating and the answering VDMs terminate or drop the connection (FIG. 7, step 555, FIG. 8, step 645) by the controller 215 issuing a command to DAA-2 270 to go on hook, and the program execution stops (FIG. 7, step 560, FIG. 8, step 650).

If the disconnect request is for discontinuing the voice session, then the method proceeds to the VOICE path as indicated in FIGS. 7 and 8 and the originating VDM (such as VDM 110) issues a disconnect command to the remote VDM, such as VDM 150 (FIG. 7, step 565). In response to the disconnect command, the answering VDM disconnects the voice line, through the controller 215 of the answering VDM issuing a disconnect command to DAA-1 235 (FIG. 8, step 655). At the same time, the originating VDM determines if another voice session has been requested (FIG. 7, step 570). If so, then the method proceeds with the voice session telephone call placement procedures illustrated in FIG. 5 beginning with step 360 (FIG. 7, step 575, "GO TO B"). Similarly, after the voice line has been disconnected, the answering VDM determines if another voice session has been requested (FIG. 8, step 656). If another voice session has been requested in step 656, then the method proceeds with step 657 ("GO TO D") and continues with step 455 of FIG. 6. If another voice session is not requested (FIG. 7, step 570; FIG. 8, step 656), then the originating and answering VDMs determine the status of the data session (FIG. 7, step 580, FIG. 8, step 660). If the data session has ended, then the connection is dropped (FIG. 7, step 595; FIG. 8, step 685). If the data session has not ended, then both the originating and answering VDMs wait for the data session to end (FIG. 7, step 590, returning to step 580; FIG. 8, step 670, returning to step 656) before dropping the connection (FIG. 7, steps 580 and 595, FIG. 8, steps 660 and 685). Once the connection is dropped, program execution terminates (FIG. 7, step 596, FIG. 8, step 680).

In summary, FIGS. 7 and 8 disclose a method for terminating a simultaneous voice session and a data session over a first network telecommunications connection, with the simultaneous voice session and data session occurring between and among a plurality of locations via a plurality of voice data modems, the plurality of voice data modems including a local voice data modem and an intermediate voice data modem, the first network telecommunications connection having been established between the local voice data modem and the intermediate voice data modem, the data session occurring between first data terminal equipment connected to the local voice data modem and second data terminal equipment connected to the intermediate voice data modem, and with the voice session occurring between a local telephone connected to the local voice data modem and a remote telephone at a third location of the plurality of locations over a second telecommunications connection having been established between the intermediate voice data modem and the remote telephone (FIG. 7, step 500, FIG. 8, step 600). The method then comprises: (a) issuing a disconnection request, which may be from the data terminal equipment or from the telephone, to the local voice data modem and the intermediate voice data modem (FIG. 7, step 510; FIG. 8, step 610); (b) determining whether the disconnection request is a voice session disconnection request (FIG. 7, step 520, VOICE path; FIG. 8, step 620, VOICE path); (c) determining whether the disconnection request is a data session disconnection request (FIG. 7, step 520, DATA path; FIG. 8, step 620, DATA path); (d) when the disconnection request is a voice session disconnection request, terminating the voice session connection after the data session has ended (FIG. 7, steps 565, 570, 580, 590, 595, 596; FIG. 8, step 655, 656, 660, 670, 680, 685); and (e) when the disconnection request is a data session disconnection request, terminating the data session connection after the voice session has ended ((FIG. 7, steps 525, 530, 540, 550, 555, 560; FIG. 8, step 625, 626, 630, 640, 645, 650).

In addition to a two channel system, such as multiplexed voice and data transmissable over a single network extension to multiple locations, the present invention may also be extended to a method, system and VDM having multiple, additional channels, such as a video channel. For example, the VDM of the present invention may provide for video and voice multiplexing, or video, voice and data multiplexing. Furthermore, the system of the present invention may also include additional stages of intermediate VDMs, to provide for additional routing to additional locations. In addition, the apparatus and methodology of the present invention may by equivalently extended to ISDN network environments, for example, utilizing an ISDN terminal adapter rather than an analog or digital modem.

As mentioned above, the apparatus, method and system in accordance with the present invention overcomes a significant difficulty of current voice data modems, namely, the inability of current voice data modems to have simultaneous voice and data sessions with devices or operators at different locations. The apparatus, method and system of the present invention provides for a user at a first location to simultaneously have a voice session with a user at a second location and a data session with a user at a third location, all over the same, single telephone line, allowing the voice session to operate independently of the data session, and vice-versa. Also as mentioned above, in home office environments, this apparatus and system may save the added expense of installation and maintenance of a second telephone line. In other environments, such as during business travel when a second telephone line may be unavailable, this apparatus and system enables such diverse communication which was previously unavailable. Such advantages are highly desireable for persons operating either in a remote office or in transit where access to telephone services may be limited.

From the foregoing, it will be observed that numerous variations and modifications may be effected without departing from the spirit and scope of the novel concept of the invention. It is to be understood that no limitation with respect to the specific methods and apparatus illustrated herein is intended or should be inferred. It is, of course, intended to cover by the appended claims all such modifications as fall within the scope of the claims. The invention is further defined by the following claims.

I claim:

1. A method for terminating a simultaneous voice session and a data session over a first network telecommunications connection, the simultaneous voice session and data session occurring between and among a plurality of locations via a plurality of voice data modems, the plurality of voice data modems including a local voice data modem and an intermediate voice data modem, the first network telecommunications connection having been established between the local voice data modem and the intermediate voice data modem, the data session occurring between first data terminal equipment connected to the local voice data modem and second data terminal equipment connected to the intermediate voice data modem, the voice session occurring between a local telephone connected to the local voice data modem and a remote telephone at a third location of the plurality of locations over a second telecommunications connection having been established between the intermediate voice data modem and the remote telephone, the method comprising:

(a) issuing a disconnection request to the local voice data modem and the intermediate voice data modem;

(b) determining whether the disconnection request is a voice session disconnection request;

(c) determining whether the disconnection request is a data session disconnection request;

(d) when the disconnection request is a voice session disconnection request, terminating the voice session connection after the data session has ended; and (e) when the disconnection request is a data session disconnection request, terminating the data session connection after the voice session has ended.

2. The method of claim 1 wherein step (d) further comprises:

(d1) when the disconnection request is a voice session disconnection request, determining whether there is a request for another voice session; and (d2) when there is a request for another voice session, proceeding to establish the requested voice session.

3. The method of claim 1 wherein step (e) further comprises:

(e 1) when the disconnection request is a data session disconnection request, determining whether there is a request for another data session; and (e 2) when there is a request for another data session, proceeding to establish the requested data session.

* * * * *

UNITED STATES PATENT AND TRADEMARK OFFICE
CERTIFICATE OF CORRECTION

PATENT NO. : 5,699,413　　　　　　　　　　　　　　　　　　　　　Page 1 of 1
DATED      : December 16, 1997
INVENTOR(S): Manickam R. Sridhar It is certified that error appears in the above-identified patent and that said Letters Patent is hereby corrected as shown below:

Abstract of the invention,
Line 10, which reads: connected to first extensions of a net telco jacks are ...
delete "net" and insert -- network, and -- such that the line reads, connected to first extensions of a network, and telco Signed and Sealed this Twenty-eighth Day of August, 2001

Attest:

NICHOLAS P. GODICI
Attesting Officer　　Acting Director of the United States Patent and Trademark Office